(12) United States Patent
Jiao et al.

(10) Patent No.: US 8,963,930 B2
(45) Date of Patent: Feb. 24, 2015

(54) TRIANGLE SETUP AND ATTRIBUTE SETUP INTEGRATION WITH PROGRAMMABLE EXECUTION UNIT

(75) Inventors: Yang (Jeff) Jiao, San Jose, CA (US); Mike Hong, Cupertino, CA (US); Yin Li, Shanghai (CN); Yunjie Xu, Shanghai (CN)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1188 days.

(21) Appl. No.: 11/954,621

(22) Filed: Dec. 12, 2007

(65) Prior Publication Data

US 2009/0153570 A1    Jun. 18, 2009

(51) Int. Cl.
*G06T 1/00* (2006.01)
*G06T 15/00* (2011.01)

(52) U.S. Cl.
CPC .................................. *G06T 15/005* (2013.01)
USPC .......................................... 345/501; 345/426

(58) Field of Classification Search
USPC ................................................ 345/426, 501
See application file for complete search history.

(56) References Cited

U.S. PATENT DOCUMENTS 7,454,599 B2    11/2008 Jiao et al.
7,692,660 B2    4/2010 Markovic et al.
2004/0008200 A1*    1/2004 Naegle et al. ................. 345/505
2005/0231533 A1*    10/2005 Chen ............................. 345/643
2007/0091089 A1*    4/2007 Jiao et al. ...................... 345/426

FOREIGN PATENT DOCUMENTS

CN        1056968 A        12/1991
CN        1928918 A        3/2007

OTHER PUBLICATIONS

"A 3-way SIMD Engine for Programmable Triangle Setup in Embedded 3D Graphics Hardware" Chung et al. IEEE 2005.*
English translation of abstract of CN 1928918 A.
English translation of abstract of CN 1056968 A.

* cited by examiner

*Primary Examiner* — Maurice L McDowell, Jr.
(74) *Attorney, Agent, or Firm* — McClure, Qualey & Rodack, LLP (57) ABSTRACT

A system for integrating triangle setup and attribute setup operations into a programmable execution unit of a graphics processing unit is disclosed. A method for integrating triangle setup and attribute setup operations into a programmable execution unit graphics processing unit is also disclosed. In one embodiment, at least one execution unit is configured for multi-threaded operation. The at least one execution unit is configured to execute at least one thread for triangle setup operations and attribute setup operations as well as threads for pixel shader, geometry shader and vertex shader operations.

20 Claims, 6 Drawing Sheets

TRIANGLE SETUP AND ATTRIBUTE SETUP INTEGRATION WITH PROGRAMMABLE EXECUTION UNIT

CROSS-REFERENCE TO RELATED APPLICATIONS

This application is related to co-pending U.S. patent application Ser. No. 12/764,243 filed Apr. 21, 2010, and entitled "SYSTEM AND METHOD FOR MANAGING THE COMPUTATION OF GRAPHICS SHADING OPERATIONS," which is incorporated by reference in its entirety into the present disclosure. This application is also related to co-pending U.S. patent application Ser. No. 12/764,256 filed Apr. 21, 2010, and entitled "SYSTEMS AND METHODS FOR IMPROVING THROUGHPUT OF A GRAPHICS PROCESSING UNIT," which is incorporated by reference in its entirety into the present disclosure.

FIELD OF THE DISCLOSURE

The present disclosure generally relates to computer graphics systems, and more particularly relates to systems and methods for implementing triangle setup and attribute setup stages of a graphics pipeline.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (X, Y, Z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions are covered by the polygon and attempts to write the associated color values and depth (Z value) into a frame buffer. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

The default methods of performing real-time rendering typically display polygons as pixels located either inside or outside the polygon. The resulting edges which, define the polygon, can appear with a jagged look in a static display and a crawling look in an animated display. The underlying problem producing this effect is called aliasing and the methods applied to reduce or eliminate the problem are called anti-aliasing techniques.

Screen-based anti-aliasing methods do not require knowledge of the objects being rendered because they use only the pipeline output samples. One typical anti-aliasing method utilizes a line anti-aliasing technique called Multi-Sample Anti-Aliasing (MSAA), which takes more than one sample per pixel in a single pass. The number of samples or sub-pixels taken for each pixel is called the sampling rate and, axiomatically, as the sampling rate increases, the associated memory traffic also increases.

Although the foregoing has only briefly summarized the operation of the various processing components, persons skilled in the art will recognize that the processing on graphics data is quite intense. Consequently, it is desired to improve processing, design, and manufacturing efficiency wherever possible. Fixed function stages of a graphics pipeline such as triangle setup and attribute setup are required for the processing of geometry primitives and pixels in a graphics pipeline. Such fixed function stages included in graphics processing units known in the art are executed in fixed function hardware components or dedicated hardware. The separate triangle setup and attribute setup units that are typically employed require a considerable number of gates, communication lines and hardware cost. Further, altering the triangle setup and attribute setup stages of a graphics pipeline requires changes to these costly hardware components. Therefore, a heretofore unaddressed need exist to overcome these deficiencies of the prior art.

SUMMARY OF THE INVENTION

The present disclosure is generally related to systems and methods of implementing triangle setup and attribute setup stages of a graphics pipeline. Briefly described, in architecture, one embodiment of the system, among others, can be implemented as follows: The system comprises at least one execution unit, the at least one execution unit being configured for multi-threaded operation, wherein the at least one execution unit is configured to execute at least one thread for triangle setup operations and attribute setup operations. The at least one execution unit is programmable to execute at least one thread for at least one chosen from: vertex shader operations, pixel shader operations and geometry shader operations. The at least one execution unit is further configured to suspend at least one thread created for triangle setup operations and attribute setup operations. The at least one execution unit is further configured to output data from triangle setup operations from the at least one thread to at least one hardware component external to the execution unit. The at least one execution unit is further configured to resume the suspended thread when data corresponding to the at least one thread is received. Finally, the at least one execution unit is further configured to store result data from the thread in a buffer within the at least one execution unit for use by a subsequent thread created by the at least one execution unit.

One embodiment of a method includes the step of receiving vertex data, the vertex data corresponding to a geometry primitive. The embodiment further includes creating a thread within an execution unit configured for multithreaded operation, where the execution unit is further configured to execute programmable shader operations. The embodiment further includes executing triangle setup operations within the thread on the vertex data. Finally, the embodiment includes executing attribute setup operations within the thread to generate pixel attributes identified in connection with the vertex data, and terminating the thread.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE DRAWINGS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
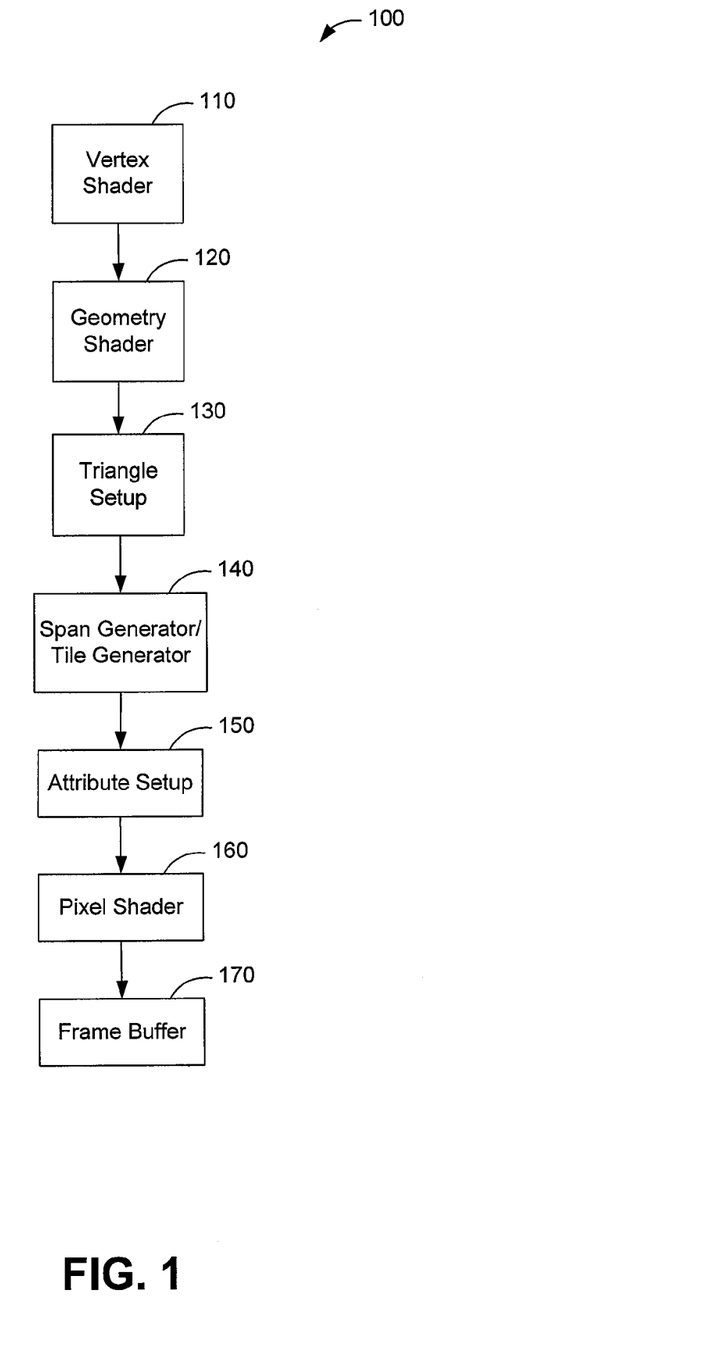
FIG. 1 depicts a functional flow diagram of certain components within a graphics pipeline in a computer graphics system.

As summarized above, the present invention is directed to a novel system and method for integrating triangle setup and attribute setup operations into a programmable execution unit. Before discussing implementation details of various embodiments, reference is made to FIG. 1, which is a block diagram illustrating certain components in a graphics pipeline, which may be utilized by or in embodiments of the present invention. The principle components illustrated in FIG. 1 are a vertex shader 110, geometry shader 120, triangle setup logic 130, span and tile generator 140, attribute setup logic 150, pixel shader 160, and a frame buffer 170. The general function and operation of these components are known and understood by persons skilled in the art, and therefore need not be described in detail herein. To summarize, however, graphics primitives may be defined by location data (e.g., X, Y, Z, and W coordinates) as well as lighting and texture information. All of this information can be passed to a vertex shader 110. As is known, the vertex shader 110 may perform various transformations on the graphics data received from the command list. In this regard, the data may be transformed from World coordinates into Model View coordinates, into Projection coordinates, and ultimately into Screen coordinates. The functional processing performed by the vertex shader 110 is known by persons skilled in the art and need not be described further herein. The vertex shader 110 outputs a geometry primitive to a geometry shader 120.

Geometry and other graphics data generated by the geometry shader 120 are communicated to triangle setup logic 130 for performing a triangle setup operation. Specific functions and implementation details of the triangle setup logic 130 may vary from embodiment to embodiment. In general, vertex information about triangle primitives may be passed to the triangle setup logic 130, and operations may be performed on the various primitives defined by the graphics data that is passed to the triangle setup logic 130. Among other operations, certain geometry transformations may be performed within the triangle setup logic 130.

By way of illustration, for a given vertex, geometry data such as x, y, z, and w information may be provided (where x, y, and z are geometric coordinates, and w is the homogenous coordinate). As is known by persons skilled in the art, various transformations may be made from, for example, model space to world space to eye space, to projection space, to homogeneous space, to normalized device coordinates (or NDC), and finally to screen space (performed by a viewport transformation). It would be appreciated that certain components of the depicted graphics pipeline have been omitted from the illustration for ease of depiction and clarity, but are known to those skilled in the art. As a non-limiting example, certain stages of the rasterization pipe of a graphics pipeline have been omitted for the sake of clarity, but a person of ordinary skill in the art would appreciate that the graphics pipeline may include those other stages.

Figure 2:
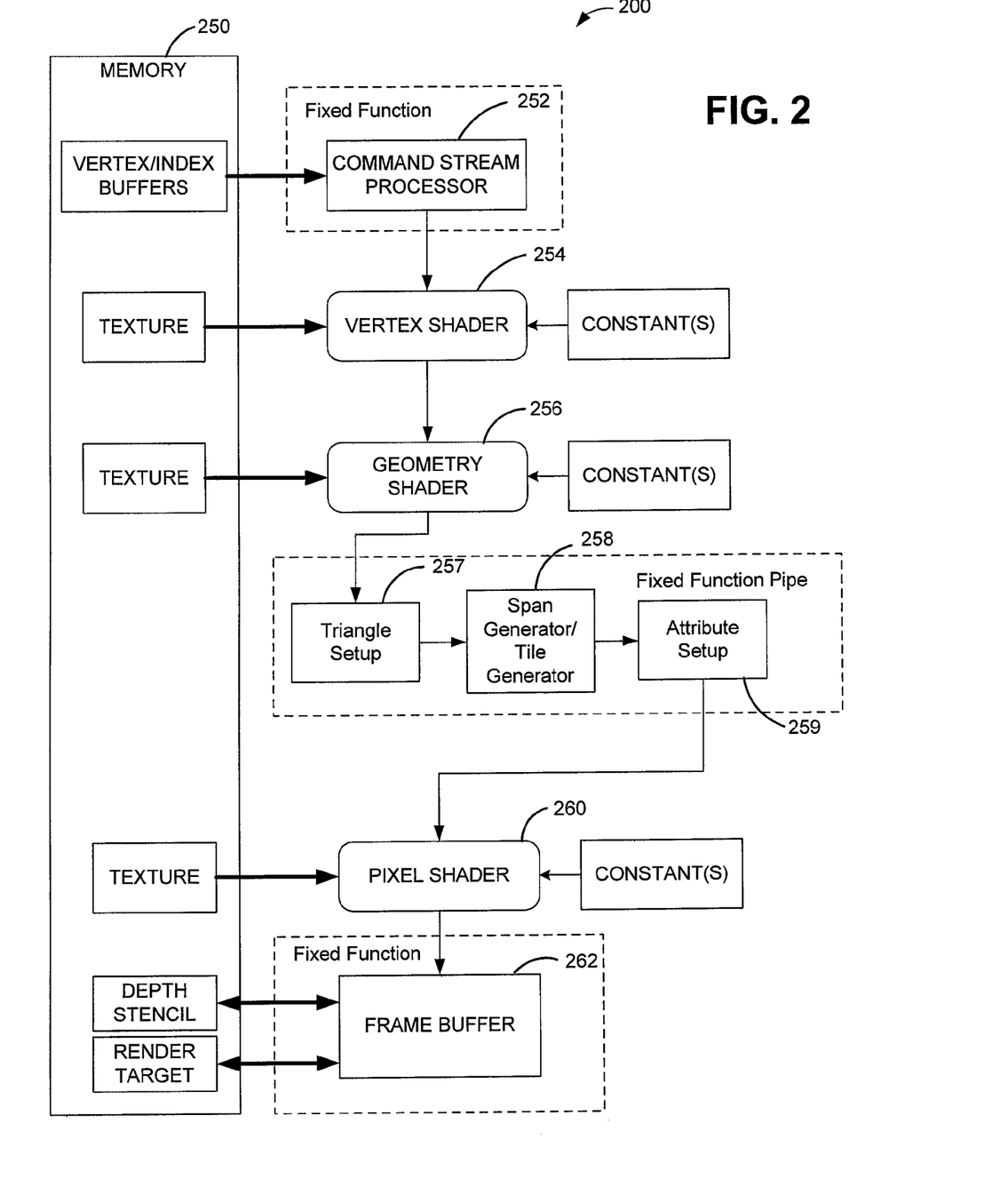
FIG. 2 depicts a block diagram illustrating certain fixed function and programmable components of a graphics system.
Figure 3:
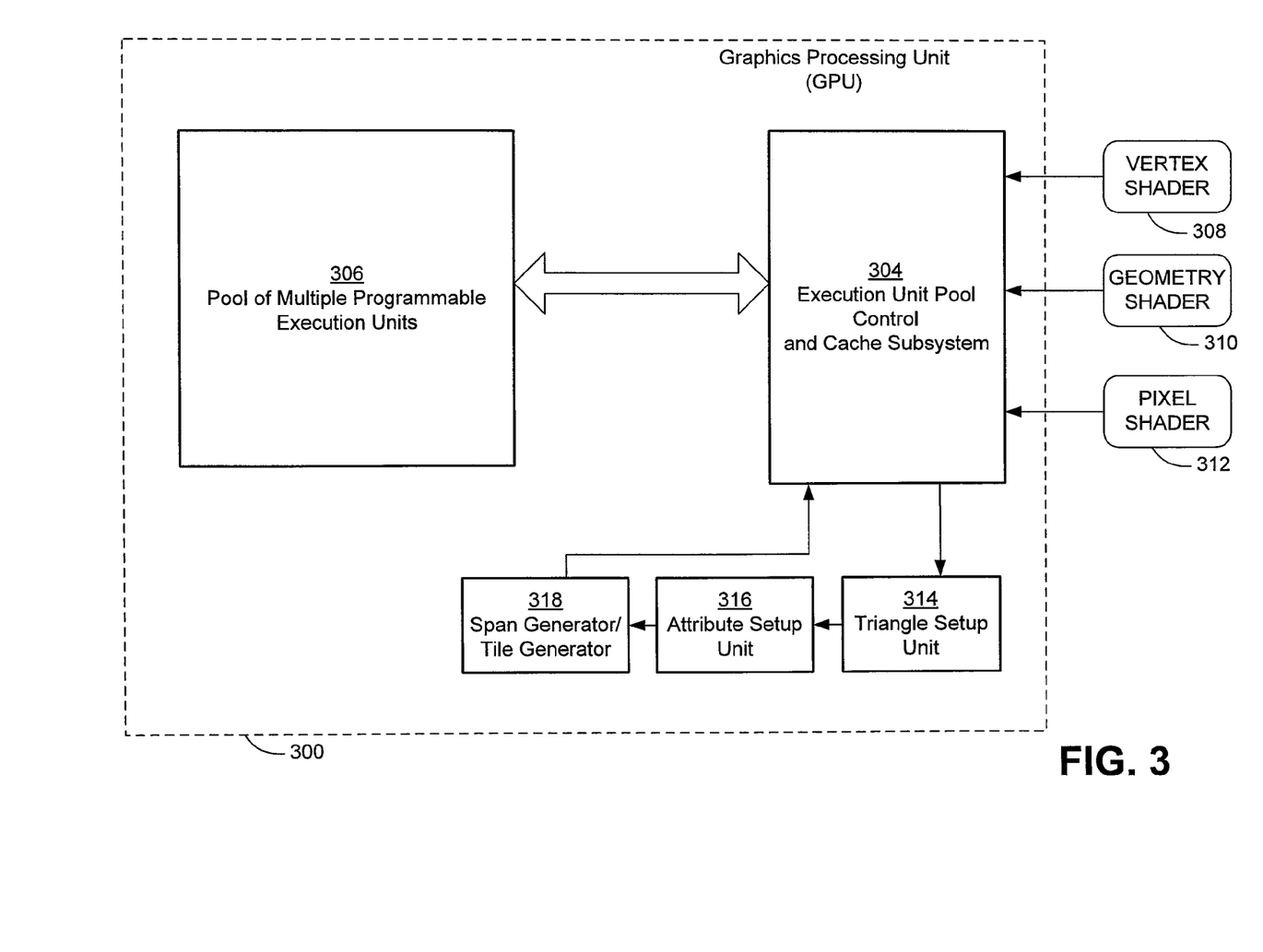
FIG. 3 depicts a functional block diagram illustrating a graphics processing unit and certain internal components of the graphics processing unit.

Reference is now made to FIG. 2 which is a block diagram illustrating certain components or stages of a graphics pipeline 200. The first component is designated as a command stream processor 252, which essentially receives or reads vertices out of memory 250, which are used to form geometry primitives and create working items for the pipeline. In this regard, the command stream processor 252 reads data from memory 250 and from that data generates triangles, lines, points, or other primitives to be introduced into the pipeline. This geometry information, once assembled, is passed to the vertex shader 254. The vertex shader 254 is depicted with rounded edges, which is a convention hereinafter adopted to depict those stages of a graphics pipeline that are implemented by executing instructions in a programmable execution unit or pool of execution units as depicted in FIG. 3. The vertex shader 254, as is known, processes vertices, by performing operations such as transformations, scanning, and lighting. Thereafter, the vertex shader 254 passes data to the geometry shader 256. The geometry shader 256 receives, as inputs, vertices for a full primitive, and is capable of outputting multiple vertices that form a single topology, such as a triangle strip, a line strip, point list, etc. The geometry shader 256 may be further configured to perform the various algorithms, such as tessellation, shadow volume generation, etc.

The geometry shader 256 outputs information to a triangle setup stage 257, which, as is known in the art, performs operations such as triangle trivial rejection, determinant calculation, culling, pre-attribute setup KLMN, edge function calculation and guardband clipping. The operations necessary for a triangle setup stage should be appreciated by one of ordinary skill in the art and need not be elaborated further. The triangle setup stage 257 outputs information to the span and tile generator 258. This stage of the graphics pipeline is known in the art, and need not be discussed in further detail. By way of summary, however, among the operations performed by the span and tile generator 258 is the rejection of triangles if it is not necessary to render such a triangle to the screen. It should be appreciated that other elements of a rasterization pipeline may operate, such as, for example a Z-test or other fixed function elements of a graphics pipeline. For example a Z-test may be performed to determine the depth of a triangle to further determine if the triangle should be rejected as unnecessary to render to the screen. However, such elements are not further discussed herein as they should be appreciated by a person of ordinary skill in the art.

If a triangle processed by the triangle setup stage 257 is not rejected by the span and tile generator 258 or other stage of the graphics pipeline, then the attribute setup stage 259 of the graphics pipeline will perform attribute setup operations. The attribute setup stage 259 generates the list of interpolation variables of known and required attributes to be determined in the subsequent stages of the pipeline. Further, the attribute setup stage 259, as is known in the art, processes various attributes related to a geometry primitive being processed by the graphics pipeline.

The pixel shader 260 is invoked for each pixel covered by the primitive that is output by the attribute setup stage 259. As is known, the pixel shader 260 operates to perform interpolations and other operations that collectively determine pixel colors for output to a frame buffer 262. The operation of the various components illustrated in FIG. 2 are well known to persons skilled in the art, and need not be further described herein. Therefore, the specific implementation and operation internal to these units need not be described herein to gain and appreciate a full understanding of the present invention.

Reference is made to FIG. 3, which depicts an exemplary graphics processing unit (GPU) 300. The graphics system includes an ability to create a programmable shader, such as a geometry shader 310, pixel shader 312, vertex shader 308, or others known in the art. Such shaders are created by a programmer and may be executed by at least one of a pool of multiple programmable execution units 306. It should be appreciated that the pool of execution units 306 can include a processing core capable of multithreaded operation. Therefore, the pool of execution units 306 can initiate more than one thread allocated to a particular type of shader. For example, the pool of execution units 306 can initiate and execute a thread for a geometry shader 310 on one set of data simultaneously with a thread for a vertex shader 308 on another set of data. As an example with regard to the structure and operation of an exemplary pool of execution units 306 configured to execute programmable shader operations, pending application Ser. No. 11/406,543, filed Apr. 19, 2006, is incorporated herein by reference.

By way of summary of the above structure, however, each execution unit in a pool of execution units 306 is capable of processing multiple instructions within a single clock cycle. Therefore, each execution unit can process multiple threads simultaneously. For example, as noted above, an execution unit can process a thread for geometry shader operations simultaneous with a thread for pixel shader operations. A scheduler receives incoming tasks from a plurality of shader stages to perform shader related computations and assigns them to execution units with capacity. The threads within execution units of the pool 306 are individually scheduled to perform shader-related computations, such that a given thread can be scheduled over time to perform shader operations for different shader stages. Further, within a given execution unit, certain threads may be assigned to a task of one shader, while other threads may be simultaneously assigned to tasks of the other shader units. In this way, load can be balanced among execution units in the system to achieve optimal throughput. Similarly, load can be balanced among available threads within a pool of execution units 306 to maximize throughput of the system. Since prior art graphics systems used dedicated shader hardware, robust and dynamic thread management such as in the above structure has previously not been utilized for graphics system. Accordingly, the flexibility and extendibility of graphics system of this structure have previously not been realized.

The execution unit pool control and cache subsystem 304 contains level 2 caches for use by the pool of execution units 306 as well as systems for scheduling the pool of executions units 306. In the depicted graphics processing unit, communication with the pool of execution units 306 to components external to the pool of execution units 306 is done via the execution unit pool control and cache subsystem 304. However, it is known that other lines and/or communication links may be established directly to the pool of execution units 306 to facilitate execution of a graphics pipeline. In particular, the triangle setup unit 314, attribute setup unit 316 and span and tile generator 318 are depicted as fixed function hardware logic components that can communicate to the pool of execution units 306 via the execution unit pool control and cache subsystem 304.

As noted above in reference to FIG. 2, certain components of the graphics pipeline have been omitted from the drawings for clarity. Similarly, certain components of the graphics processing unit 300 have been omitted from FIG. 3 for clarity. However, a person of ordinary skill in the art would appreciate that other components may be required. Similarly, the operations required for triangle setup, attribute setup and span and tile generator are known to a person of ordinary skill in the art and need not be discussed in further detail. By way of example, the triangle setup unit 314 performs operations such as triangle trivial rejection, determinant calculation, bounding box calculation, culling, pre-attribute setup KLMN, edge function generation, clipping, and guardband clipping. Similarly, the attribute setup unit 316 performs operations such as processing attributes corresponding to pixels in preparation for a pixel shader 312 and pixel shader operations.

Figure 4:
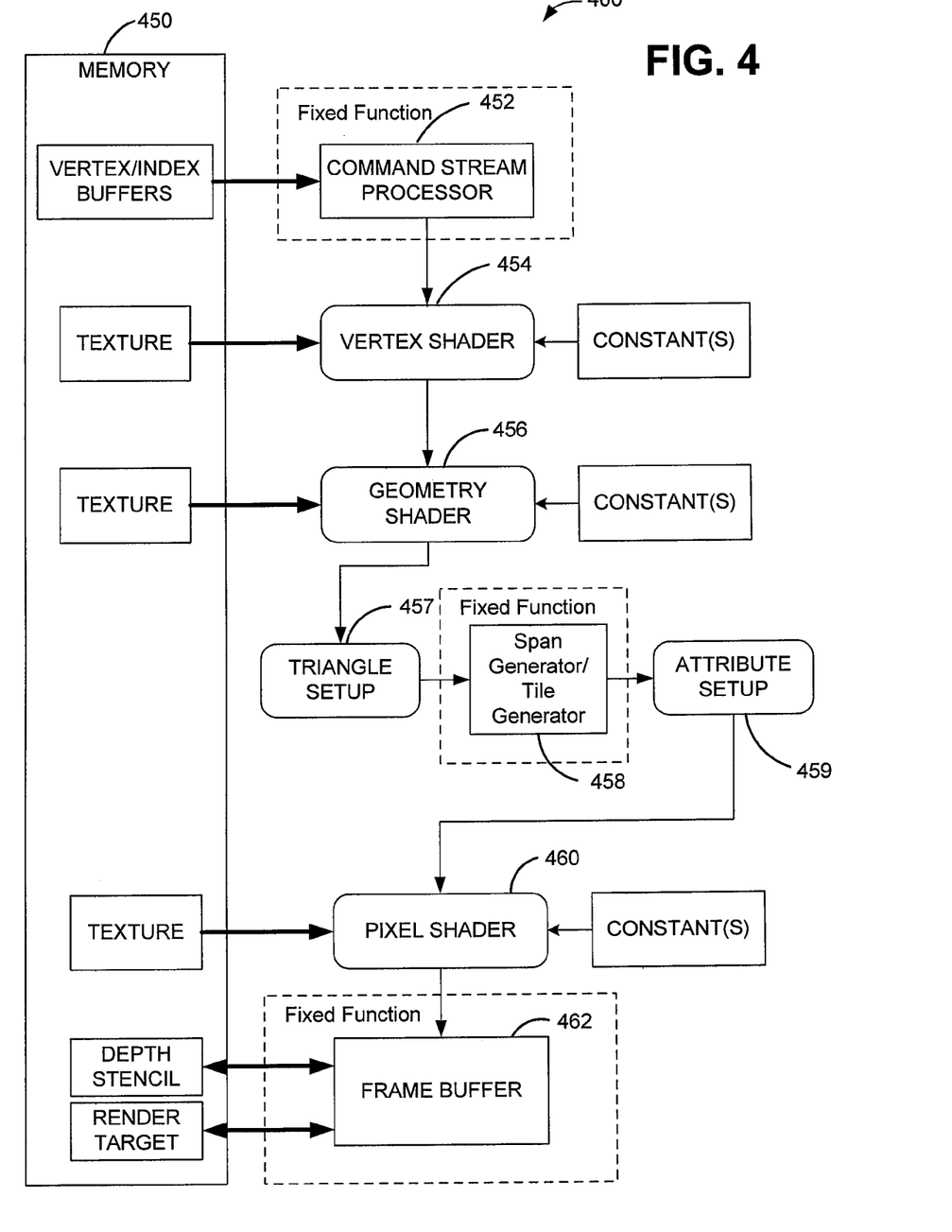
FIG. 4 depicts a block diagram illustrating certain fixed function and programmable components of a graphics system.

Reference is now made to FIG. 4, which depicts a graphics pipeline 400 in accordance with an embodiment of the disclosure. The graphics pipeline 400 depicted in FIG. 4 represents a novel departure from graphics pipelines as represented in the prior art. Data generally moves in a downward direction in the graphics pipeline 400 beginning with the command stream processor 452 that functions as noted above in a graphics pipeline. As noted above, the vertex shader 454 is depicted with rounded edges, indicating that it is a stage of the graphics pipeline 400 implemented by executing instructions in a programmable execution unit or pool of execution units. Similarly, the geometry shader 456 is also a programmable stage of the graphics pipeline 400 and thus implemented by executing instructions in a programmable execution unit or pool of execution units.

As noted above, the triangle setup stage 457 of the graphics pipeline 400 is generally a fixed function stage, which means that the stage is not user programmable. The triangle setup stage 457 accepts data and performs predetermined operations on the data and outputs a result. Previous implementations of the triangle setup stage 457 have generally included a separate hardware component apart from a programmable execution unit utilized for programmable stages of the graphics pipeline 400 such as a geometry shader 456 or vertex shader 454. In accordance with an embodiment of the disclosure, the triangle setup stage 457 can be implemented within a programmable execution unit or a pool of execution units. Triangle setup 457 can be implemented within a programmable execution unit despite the fact that the triangle setup stage 457 is generally not a user programmable stage of a graphics pipeline. As noted above, triangle setup operations can include triangle trivial rejection, determinant calculation, bounding box calculation, culling, pre-attribute setup KLMN, edge function generation, clipping, and guardband clipping.

Similarly, in accordance with the depicted embodiment, the attribute setup stage 459 can also be implemented within a programmable execution unit while the attribute setup stage 459 is generally not a user programmable stage of a graphics pipeline. Attribute setup operations can include processing attributes corresponding to pixels in preparation for a pixel shader 460 and pixel shader operations. In accordance with the disclosure, the operations for the triangle setup stage 457 and the attribute setup stage 459 can be implemented in software rather than in a fixed function hardware component. In other words, software interacting with a pool of execution units can issue a set of instructions to operate on a set of data to complete triangle setup or attribute setup operations.

In accordance with FIG. 4, the span and tile generator 458 is implemented as a fixed function hardware component rather than a stage of the graphics pipeline implemented within a programmable execution unit. However, a person of ordinary skill in the art should appreciate that the span and tile generator 458 or other stages of a graphics pipeline, including but not limited to fixed function stages of a rasterization pipeline not shown could also be implemented via software instructions executed in a programmable execution unit.

Figure 5:
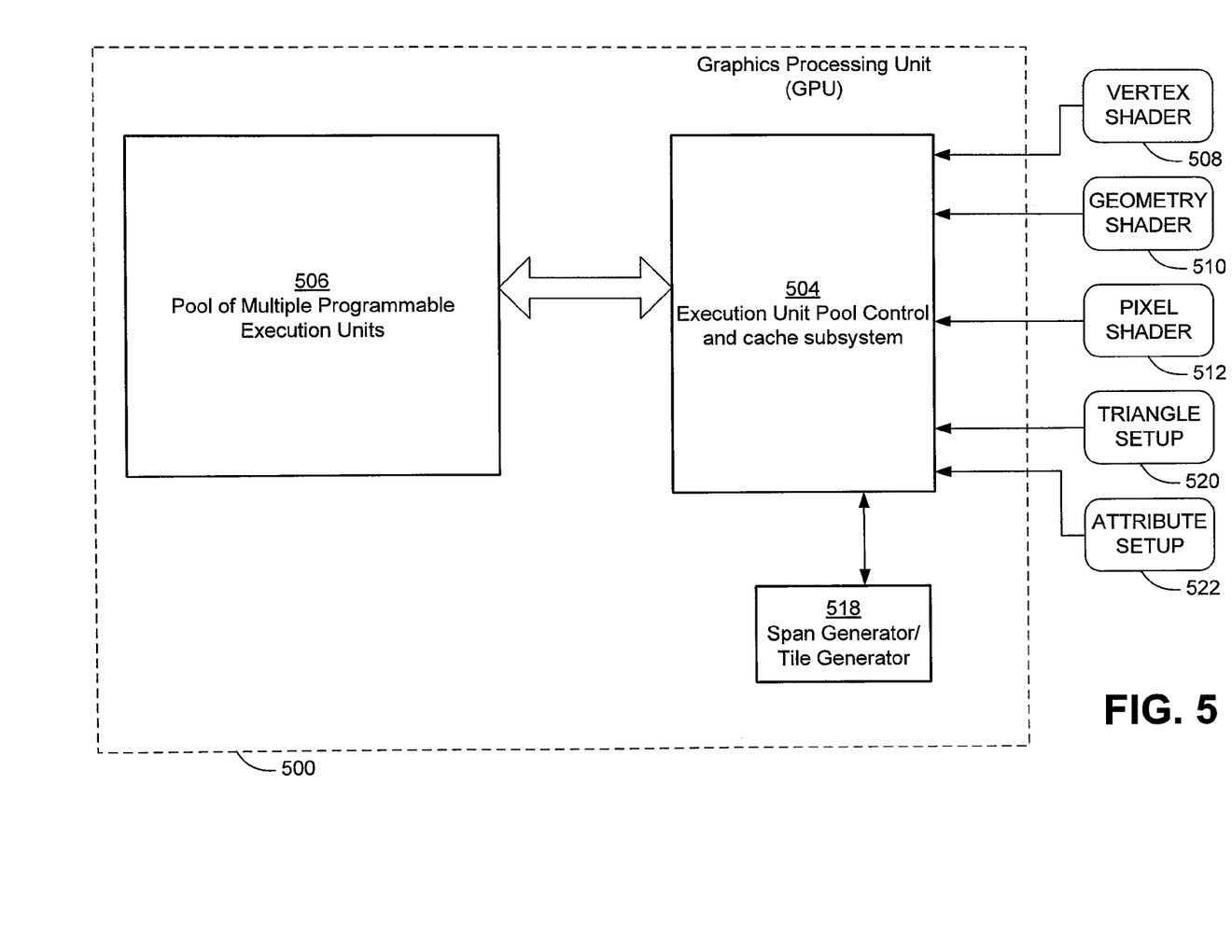
FIG. 5 depicts a functional block diagram illustrating a graphics processing unit and certain internal components of the graphics processing unit.

Reference is now made to FIG. 5, which depicts a graphics processing unit 500 in accordance with an embodiment of the disclosure. As noted above, certain components of the graphics processing unit 500 have been omitted from the illustration for clarity. However, a person of ordinary skill in the art would appreciate that other hardware and logical components not pictured may be present in the graphics processing unit 500. The depicted graphics processing unit 500 includes a pool of multiple programmable execution units 506 and an execution unit pool control and cache subsystem 504. The execution unit pool control and cache subsystem 504 can handle thread management of the processing core of the pool of multiple programmable execution units 506 as well as communication between a user of the system and other components within the graphics processing unit 500. A cache subsystem including one or more caches for use by the execution unit pool 506 can also reside in the execution unit pool control and cache subsystem 504. The cache subsystem can be used, for example, by a vertex shader thread 508 to store data for use by a subsequent thread executing triangle setup operations 520 or for typical memory transactions. Alternatively, each execution unit in the execution unit pool 506 may include an execution unit buffer for the storage of data for use by a subsequent thread executing within the same execution unit.

As noted above, user programmable stages of a graphics pipeline, such as a geometry shader 510, a vertex shader 508 or a pixel shader 512 are executed within the pool of execution unit 506. Because the pool of execution units 506 is preferably a processing core capable of multithreaded operation, the execution unit pool control and cache subsystem 504 is preferably responsible for scheduling of threads within the pool of execution unit 506. When the execution unit pool control and cache subsystem 504 receives a request for the execution of a programmable shader, it will instruct an execution unit in the pool of execution unit 506 to create a new thread for execution of the shader. The execution unit pool control and cache subsystem 504 can manage load across the execution unit pool 506 as well as shift resources from one type of shader to another to efficiently manage throughput of the graphics pipeline. Such thread management techniques are known to persons skilled in the art and need not be discussed in further detail herein. However, by way of example, if pixel shader operations 512 are the source of a bottleneck in terms of throughput of the GPU 500, then the execution unit pool control and cache subsystem 504 can allocate more execution unit resources to pixel shader operations 512 in order to improve throughput.

In accordance with an embodiment of the disclosure, when the execution of a graphics pipeline calls for triangle setup 520 or attribute setup 522 operations an additional thread can be created to execute operations of triangle setup 520 or attribute setup 522. In contrast to the graphics processing unit of FIG. 3, which discloses a graphics processing unit where a triangle setup unit and an attribute setup unit are implemented as separate hardware components within the GPU, the triangle setup 520 and attribute setup 522 stages of the depicted embodiment are implemented in software executed within a pool of multiple execution units 506. In other words, in addition to executing threads for programmable shader operations as noted above, the pool of multiple execution units 506 can be utilized to triangle setup 520 and attribute setup 522 operations by creating a thread within an execution unit capable of executing triangle setup 520 and attribute setup 522 operations.

The software instructions for execution triangle setup 520 and attribute setup 522 operations can be stored in and originate from an execution unit itself, execution unit pool control and cache subsystem 504, or, alternatively, the software instructions implementing triangle setup 520 and attribute setup 522 operations can originate from a software device driver or other location that should be appreciated by a person of ordinary skill in the art.

To execute triangle setup 520 and attribute setup 522 operations a thread can be created within the pool of multiple execution units 506. Triangle setup 520 and attribute setup 522 operations can be executed within the thread rather than within a hardware component separate from the pool of multiple execution units 506. Because the pool of multiple programmable execution units 506 is capable of multithreaded operation, a thread for executing triangle setup 520 and attribute setup 522 operations can be created while an additional thread executing other shader operations or even other triangle setup 520 and attribute setup 522 operations can simultaneously execute.

In the depicted graphics processing unit 500, the span and tile generator 518 is implemented as a hardware component external the pool of multiple execution units 506. As is known, after triangle setup 520 operations are complete, at least some of the resultant data from triangle setup 520 operations including edge functions, calculated determinant, bounding box, and Z deltas can be outputted to span and tile generator 518 as well as potentially other stages of a graphics pipeline not shown, such as Z-test. A thread executing triangle setup 520 operations can be suspended after the completion of triangle setup 520 operations and during the execution of span generator/tile generator 518 operations. Upon completion of span and tile generator 518 or other graphics pipeline operations, if a geometry primitive being manipulated by the graphics pipeline is rejected, then the thread can be terminated.

In other words, if it is not necessary to render the geometry primitive to screen, such as in the case that the geometry primitive is covered by other primitives, then it may not be necessary to continue processing the primitive in the graphics pipeline. If a geometry primitive is not rejected in this portion of the graphics pipeline, then the thread can continue execution by executing attribute setup 522 operations. As is known, attribute setup 522 operations in a graphics pipeline can include processing a plurality of attributes corresponding to a plurality of pixels prior to the execution of a user programmable pixel shader 512 thread. Upon completion of attribute setup 522 operations within the thread, the resultant data can be stored within the execution unit pool control and cache subsystem 504 in a level two cache for use by a subsequent thread, which can include a pixel shader 512 thread. Alternatively, the resultant data from the thread can be stored in a buffer within an individual execution unit and made available to the next thread created within the execution unit if the thread requires the use of the data. For example, a pixel shader 512 corresponding to pixel attributes processed by an attribute setup 522 stage can be created within an execution unit following the termination of a thread executing triangle setup 520 and attribute setup 522 operations with the pixel attributes and other data required for the pixel shader 512 thread residing in a buffer following the execution of the previous thread. Alternative embodiments can include specialized logic within an execution unit to enhance the performance of certain triangle setup 520 or attribute setup 522 operations. For example, customized logic can be incorporated within an execution unit to perform a task such as trivial triangle rejection, an operation of the triangle setup 520 stage.

An embodiment of the disclosure offers advantages over graphics processing units incorporating a separate hardware component implementation of triangle setup 520 and attribute setup 522 stages. In particular, the implementing of triangle setup 520 and attribute setup 522 stages of a graphics pipeline in software instructions executed within a pool of execution units 506 can reduce the gate count of a graphics processing unit 500 relative to one including a triangle setup unit 520 and/or an attribute setup unit 522 implemented as a hardware component separate from the pool of execution units 506. As is known, the pool of execution units 506 are required by graphics application programming interfaces to allow the GPU to execute various programmable stages of a graphics pipeline such as a geometry shader 510, vertex shader 508 or pixel shader 512. Implementing at least triangle setup 520 and attribute setup 522 stages within the pool of execution units 506 already required within the GPU can reduce the amount of gates in the system by removing at least those hardware components. It should be appreciated that reducing the gate count of a graphics processing unit can reduce the cost of designing and/or producing a GPU in accordance with an embodiment of the disclosure. Further, an embodiment of the disclosure can reduce the cost of the system by removing the need to implement a GPU with hardware lines required to pass data to and/or from a triangle setup unit 520 or an attribute setup unit 522 implemented as a separate hardware component. This is particularly useful in low-end graphics processing units or computer systems, where cost is an important consideration in the design and manufacture of hardware components.

Additionally, an embodiment of the disclosure can result in a more efficient graphics pipeline because triangle setup 520 and attribute setup 522 are executed within a pool of multiple execution units 506 capable of multithreaded operation. It should be appreciated that efficient execution of a graphics pipeline can be achieved from the thread control and scheduling of the pool of multiple execution units 506. For example, if triangle setup 520 operations are the cause of a bottleneck in a graphics pipeline, increasing resources from the pool of execution units 506 can be allocated to triangle setup 520 operations to alleviate bottlenecks or decreased performance. Alternatively, if another stage of a graphics pipeline, such as a pixel shader 512, is the cause of bottleneck in the GPU, increasing resources of the pool of multiple execution units 506 can be allocated to pixel shader 512 threads to increase the throughput of the system. Further, by design, implementing attribute setup 520 and triangle setup 522 operations in a thread executed in a pool of multiple execution units 506 creates a system that is less dependent on a single point of bottleneck. By utilizing thread management and scheduling protocols known in the art to manage the load of a pool of multiple execution units 506, the graphics pipeline can be more efficient.

Another advantage offered by an embodiment of the disclosure is the flexibility and extendibility of the elimination of separate hardware components for triangle setup 520 and attribute setup 522 operations. For example, altering the triangle setup 520 or attribute setup 522 stages in a graphics processing unit 500 in accordance with an embodiment of the disclosure can be accomplished by altering the software instructions required to execute triangle setup 520 or attribute setup 522 operations within an execution unit. In contrast, graphics processing units 500 with triangle setup 520 and attribute setup 522 stages implemented in at least one hardware component separate from a pool of multiple execution units 506 may require new hardware components to alter the triangle setup 520 or attribute setup 522 stages of the graphics pipeline. This flexibility can be useful for the fixing of bugs, the addition of new features, or the adjustment of the algorithms used for the implementation of the triangle setup 520 or attribute setup 522 stages.

Figure 6:
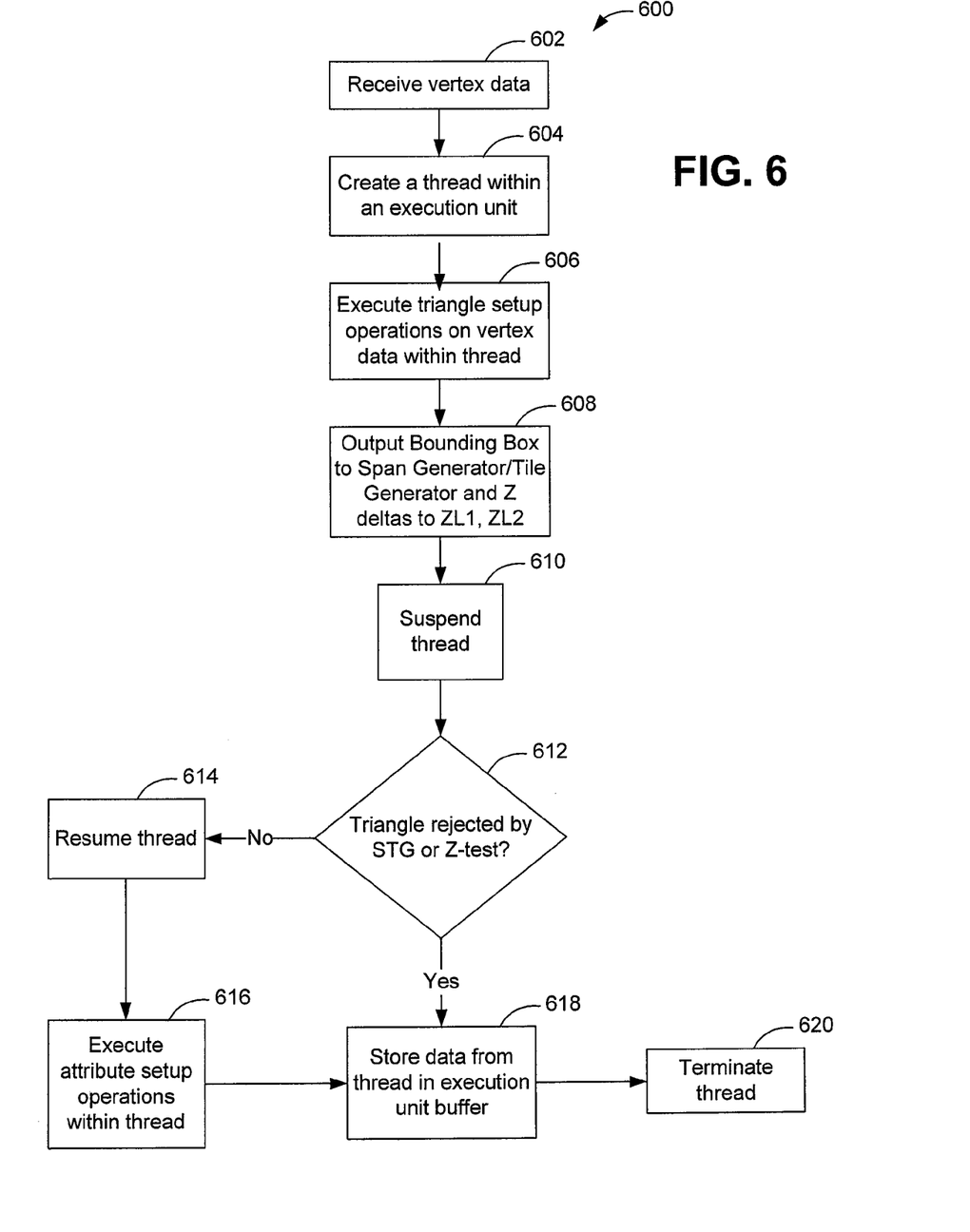
FIG. 6 depicts a flow diagram of a method in accordance with an embodiment of the disclosure.

Reference is now made to FIG. 6, which depicts a flowchart of a method embodiment 600 in accordance with the disclosure. In step 602, vertex data representing a geometry primitive is received for processing by triangle setup and attribute setup stages of a graphics pipeline. Vertex data representing a geometry primitive being processed by a graphic pipeline is preferably output by a geometry shader for processing by a triangle setup stage. In accordance with the depicted method, in step 604 a thread is created within an execution unit in which to execute triangle setup and attribute setup operations via software instructions. As noted above, triangle setup operations in a graphics pipeline can include but are not limited to: triangle trivial rejection, determinant calculation, bounding box calculation, culling, pre-attribute setup KLMN, edge function generation, clipping, and guardband clipping.

In step 608, after triangle setup operations are completed, a bounding box is output to a span and tile generator. Z deltas are also output to a Z-test stage of the graphics pipeline. Other elements of the graphics pipeline linked to the output of a triangle setup stage are not discussed herein, but are known to a person of ordinary skill in the art. For example, the triangle setup stage may output data to other elements of a rasterization pipeline for processing. After triangle setup operations are complete and at least the above outputs generated, the created thread is suspended until data is returned to the execution unit. For example, if the thread outputs data to the span and tile generator, Z-test or other stages of a rasterization pipeline, the thread must wait for operations conducted within the stages to complete before continuing to execute attribute setup operations.

In step 612, if the triangle or geometry primitive is not rejected by the span and tile generator or Z-test, the thread is resumed and attribute setup operations executed within the thread in step 616. The triangle or geometry primitive may be rejected if other elements of the graphics pipeline such as Z-test, for example, determine that the triangle need not be output to a frame buffer in a later stage of the graphics pipeline. In this situation, attribute setup operations are unnecessary. After attribute setup operations are executed data from the thread are stored in step 618. As noted above in reference to the embodiment of FIG. 6, data from the thread can be stored in a buffer within an execution unit for use by a subsequent thread created by the execution unit. Alternatively, the data may also be stored in a cache subsystem accessible by other execution units for use by threads created in other execution units. In step 620, the thread is terminated and the execution unit may then be allocated to threads devoted to other stages of a graphics pipeline.

The embodiments of the present invention can be implemented in hardware, software, firmware, or a combination thereof. In some embodiments, the compression of color data is implemented in software or firmware that is stored in a memory and that is executed by a suitable instruction execution system. If implemented in hardware, as in an alternative embodiment, the triangle setup and attribute setup stages can be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A graphics processing unit, comprising:
at least one execution unit, the at least one execution unit being configured for multi-threaded operation, wherein the at least one execution unit is configured to execute at least one thread for programmable triangle setup operations and programmable attribute setup operations via software instructions, wherein the software instructions define programmable attribute setup operations for processing attributes corresponding to pixels prior to execution of a pixel shader thread; wherein
the at least one execution unit is programmable to execute at least one thread for the pixel shader responsive to completion of the at least one thread for the programmable attribute setup operations;
the at least one execution unit is configured to suspend at least one thread created for the programmable triangle setup operations and the programmable attribute setup operations;
the at least one execution unit is further configured to output data from the programmable triangle setup operations from the at least one thread to at least one hardware component external to the at least one execution unit;
the at least one execution unit is further configured to resume the suspended at least one thread in response to receiving data corresponding to the at least one thread; and
the at least one execution unit is further configured to store result data from the at least one thread in a buffer within the at least one execution unit for use by a subsequent thread created by the at least one execution unit.

2. The graphics processing unit of claim 1, wherein the software instructions for implementing the programmable triangle setup operations and the programmable attribute setup operations originate from a software device driver.

3. A graphics processing unit, comprising:
at least one execution unit, the at least one execution unit being configured for multi-threaded operation, wherein the at least one execution unit is configured to execute at least one thread for triangle setup operations and attribute setup operations and the at least one execution unit is further configured to perform programmable shader operations via software instructions, wherein the software instructions define programmable attribute setup operations for processing attributes corresponding to pixels prior to execution of a pixel shader thread; and
an execution unit pool control subsystem configured to schedule and manage operations of the at least one thread of the at least one execution unit;

wherein the execution unit pool control subsystem is further configured to initiate the at least one thread for triangle setup operations and attribute setup operations simultaneously with the programmable shader operations.

4. The graphics processing unit of claim 3, wherein the at least one execution unit is programmable to execute operations for triangle setup via software instructions.

5. The graphics processing unit of claim 3, wherein the at least one execution unit is programmable to execute operations for attribute setup via software instructions.

6. The graphics processing unit of claim 3, wherein the at least one execution unit is programmable to execute at least one operation chosen from: triangle trivial rejection, determinant calculation, bounding box calculation, culling, pre-attribute setup KLMN, edge function generation, clipping, and guardband clipping.

7. The graphics processing unit of claim 3, wherein the at least one execution unit is programmable to execute at least one thread for at least one chosen from: vertex shader operations, pixel shader operations and geometry shader operations.

8. The graphics processing unit of claim 3, wherein the at least one execution unit is configured to output at least one of: edge functions, bounding box, Z deltas, and pixel attributes.

9. The graphics processing unit of claim 3, wherein:
the at least one execution unit is configured to suspend at least one thread created for triangle setup operations and attribute setup operations;
the at least one execution unit is further configured to output data from triangle setup operations from the at least one thread to at least one hardware component external to the at least one execution unit; and
the at least one execution unit is further configured to resume the suspended thread in response to data corresponding to the at least one thread being received.

10. The graphics processing unit of claim 3, wherein the at least one execution unit further comprises:
a buffer configured to store the results of the at least one thread executing triangle setup operations and attribute setup operations.

11. A method for performing triangle setup operation and processing attributes in a graphics processing system, comprising the steps of:
receiving vertex data, the vertex data corresponding to a geometry primitive,
creating a thread within an execution unit configured for multi-threaded operation, the execution unit further configured to execute programmable shader operations,
executing triangle setup operations within the thread on the vertex data,
executing attribute setup operations within the thread to process attributes corresponding to pixels prior to execution of a pixel shader thread, and
terminating the thread.

12. The method of claim 11, further comprising the steps of:
outputting the results of triangle setup operations to a span and tile generator,
receiving processed data from the span and tile generator, and
executing attribute setup operations to generate pixel attributes from the processed data.

13. The method of claim 11, further comprising the steps of:
suspending the thread,
outputting the results of triangle setup operations to a span and tile generator,
receiving processed data from the span and tile generator,
executing attribute setup operations to generate pixel attributes from the processed data, and
resuming the thread.

14. The method of claim 11, further comprising the step of:
storing result data of triangle setup operations and the pixel attributes in an execution unit buffer for use by a subsequent thread created by the execution unit.

15. The method of claim 14, wherein the subsequent thread is at least one chosen from: a pixel shader thread, and a vertex shader thread and a thread configured to execute triangle setup operations and attribute setup operations.

16. The method of claim 11, further comprising the step of:
storing result data of triangle setup operations corresponding to the pixel attributes in a shared cache for use by at least one subsequent thread created by at least one of a plurality of execution units, the shared cache configured to be accessible by the plurality of execution units.

17. The method of claim 11, wherein the execution unit is capable of executing pixel shader, geometry shader and vertex shader operations via software instructions.

18. The method of claim 11, wherein the execution unit is programmable to execute at least one triangle setup operation chosen from: triangle trivial rejection, determinant calculation, bounding box calculation, culling, pre-attribute setup KLMN, edge function generation, clipping, and guardband clipping.

19. The method of claim 11, wherein the execution unit is configured to output at least one of: edge functions, bounding box, Z deltas, and pixel attributes.

20. The method of claim 11, further comprising the step of:
creating an additional thread within an additional execution unit configured for multi-threaded operation, the additional execution unit further configured for triangle setup operations in parallel with the execution unit;
wherein the additional thread is executed simultaneously with the thread.

* * * * *